United States Patent
Lee

(10) Patent No.: US 11,983,626 B2
(45) Date of Patent: May 14, 2024

(54) METHOD AND APPARATUS FOR IMPROVING QUALITY OF ATTENTION-BASED SEQUENCE-TO-SEQUENCE MODEL

(71) Applicant: SAMSUNG ELECTRONICS CO., LTD., Suwon-si (KR)

(72) Inventor: Min-Joong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 719 days.

(21) Appl. No.: 17/109,490

(22) Filed: Dec. 2, 2020

(65) Prior Publication Data
US 2021/0366501 A1 Nov. 25, 2021

(30) Foreign Application Priority Data
May 25, 2020 (KR) .................. 10-2020-0062450

(51) Int. Cl.
| | |
|---|---|
| *G06N 3/02* | (2006.01) |
| *G06N 3/04* | (2023.01) |
| *G06N 3/045* | (2023.01) |
| *G06N 3/08* | (2023.01) |
| *G10L 15/16* | (2006.01) |

(52) U.S. Cl.
CPC ............... *G06N 3/08* (2013.01); *G06N 3/02* (2013.01); *G06N 3/04* (2013.01); *G06N 3/045* (2023.01); *G10L 15/16* (2013.01)

(58) Field of Classification Search
CPC ...... G06N 3/0455; G06N 3/042; G10L 15/16; G10L 15/18
See application file for complete search history.

(56) References Cited

U.S. PATENT DOCUMENTS

| | | | | |
|---|---|---|---|---|
| 10,281,885 | B1 * | 5/2019 | Chiu | ............. G05B 13/027 |
| 11,145,293 | B2 * | 10/2021 | Prabhavalkar | ......... G10L 15/16 |
| 11,556,786 | B2 * | 1/2023 | Shazeer | ............... G06N 3/045 |
| 11,625,572 | B2 * | 4/2023 | Chiu | ..................... G06N 3/045 |
| | | | | 706/16 |
| 2017/0262705 | A1 | 9/2017 | Li et al. | |

(Continued)

FOREIGN PATENT DOCUMENTS

| | | |
|---|---|---|
| CN | 109829172 A | 5/2019 |
| KR | 10-2057926 B1 | 12/2019 |

OTHER PUBLICATIONS

Xie, Ziang, et al. "Neural Language Correction with Character-Based Attention." arXiv preprint arXiv:1603.09727 Mar. 31, 2016, (10 pages in English).

(Continued)

*Primary Examiner* — Daniel Abebe
(74) *Attorney, Agent, or Firm* — NSIP Law

(57) ABSTRACT

A method and apparatus for improving the quality of an attention-based sequence-to-sequence model. The method includes determining an output sequence corresponding to an input sequence based on an attention-based sequence-to-sequence model, selecting at least one target attention head from among a plurality of attention heads, detecting at least one error output token among output tokens constituting the output sequence based on the target attention head, and correcting the output sequence based on the error output token.

40 Claims, 8 Drawing Sheets

(56) References Cited

U.S. PATENT DOCUMENTS

| | | | |
|---|---|---|---|
| 2017/0262995 A1 | 9/2017 | Li et al. | |
| 2018/0114108 A1* | 4/2018 | Lao | G06N 3/044 |
| 2019/0130213 A1 | 5/2019 | Shazeer et al. | |
| 2019/0130273 A1 | 5/2019 | Keskar et al. | |
| 2019/0205761 A1 | 7/2019 | Wu et al. | |
| 2019/0266474 A1 | 8/2019 | Stark et al. | |
| 2019/0278378 A1 | 9/2019 | Yan et al. | |
| 2019/0384970 A1 | 12/2019 | Johnson | |
| 2019/0392319 A1 | 12/2019 | Shazeer et al. | |
| 2020/0034436 A1 | 1/2020 | Chen et al. | |
| 2020/0057805 A1 | 2/2020 | Lu et al. | |
| 2020/0311353 A1* | 10/2020 | Li | G06N 3/045 |
| 2023/0237995 A1* | 7/2023 | Prabhavalkar | G10L 15/02 704/232 |

OTHER PUBLICATIONS

Schumann, Raphael, et al, "Incorporating ASR Errors with Attention-Based, Jointly Trained RNN for Intent Detection and Slot Filling." 2018 IEEE International Conference on Acoustics, Speech and Signal Processing (ICASSP), 2018, pp. 6059-6063.

Guo, Jinxi, et al, "A Spelling Correction Model for End-to-End Speech Recognition." IEEE International Conference on Acoustics, Speech and Signal Processing (ICASSP). IEEE, 2019. pp. 5651-5655.

Extended European search report dated Feb. 8, 2022, in counterpart European Patent Application No. 21159315.7 (11 pages in English).

Vaswani, Ashish, et al. "Attention is all you need." *Advances in neural information processing systems* 30 (2017): 5998-6008. (11 pages in English).

Bahdanau, Dzmitry, Kyunghyun Cho, and Yoshua Bengio. "Neural machine translation by jointly learning to align and translate." *arXiv preprint arXiv:1409.0473* (2014). (15 pages in English).

Arslan, Hasan Sait, et al. "Multimodal sequential fashion attribute prediction." *Information* 10.10 (2019): 308. (22 pages in English).

Fan, Angela, Mike Lewis, and Yann Dauphin. "Hierarchical neural story generation." *arXiv preprint arXiv:1805.04833* (2018). (11 pages in English).

Zhou, Long, Jiajun Zhang, and Chengqing Zong. "Synchronous bidirectional neural machine translation." *Transactions of the Association for Computational Linguistics* 7 (2019): 91-105. (15 pages in English).

Sutskever, Ilya, Oriol Vinyals, and Quoc V. Le. "Sequence to sequence learning with neural networks." *Advances in neural information processing systems.* 2014. (9 pages in English).

\* cited by examiner

METHOD AND APPARATUS FOR IMPROVING QUALITY OF ATTENTION-BASED SEQUENCE-TO-SEQUENCE MODEL

CROSS-REFERENCE TO RELATED APPLICATIONS

This application claims the benefit under 35 USC § 119(a) of Korean Patent Application No. 10-2020-0062450 filed on May 25, 2020 in the Korean Intellectual Property Office, the entire disclosure of which is incorporated herein by reference for all purposes.

BACKGROUND

1. Field

The following description relates to a method and apparatus for improving the quality of an attention-based sequence-to-sequence model.

2. Description of Related Art

Among many issues to be solved using an artificial neural network, to solve an issue in generating an output of undetermined length in response to an input of a sequence of undetermined length, an encoder-decoder artificial neural network model, one of sequence-to-sequence models, has been introduced.

The sequence-to-sequence model to generate an output of variable length from an input of variable length is used for various tasks such as translation, speech recognition, conversation, and document summary. The sequence-to-sequence model includes an encoder generating a context vector being a superordinate expression from a variable input and a decoder generating a variable output based on the context vector. However, the sequence-to-sequence model has a disadvantage in the quality that decreases if the length of the context vector increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of improving the quality of an attention-based sequence-to-sequence model includes determining an output sequence corresponding to an input sequence based on an attention-based sequence-to-sequence model, selecting at least one target attention head from among a plurality of attention heads, detecting at least one error output token among output tokens constituting the output sequence based on the target attention head, and correcting the output sequence based on the at least error output token.

The selecting may include selecting, as the target attention head, an attention head generating a predetermined attention weight matrix trained to be a target attention weight matrix corresponding to the target attention head.

The predetermined attention weight matrix may be trained based on a guide weight matrix having a predetermined shape.

The guide weight matrix may be determined based on any one or any combination of an output sequence length, an input frame length, a start shift, an end shift, and a diffusion ratio.

The predetermined attention weight matrix may be trained to have a different distribution of attention weights for each step.

The predetermined attention weight matrix may be trained to determine an attention weight of a current step based on a cumulative sum of attention weights of previous steps.

The selecting may include selecting, as the target attention head, an attention head generating an attention weight matrix most suitable for a predetermined purpose.

The selecting may include selecting the target attention head based on a guide weight matrix having a predetermined shape according to a predetermined purpose.

The selecting may include selecting the target attention head by performing monotonic regression analysis on attention weight matrices generated by the plurality of attention heads, in response to the attention-based sequence-to-sequence model having monotonic properties.

The selecting may include selecting the target attention head based on entropy of attention weight matrices generated by the plurality of attention heads.

The selecting of the target attention head based on the entropy may include selecting, as the target attention head, an attention head generating an attention weight matrix having the largest entropy from among the attention weight matrices.

The selecting of the target attention head based on the entropy may include selecting the target attention head based on a Kullback-Leibler divergence.

The selecting may include selecting, as the target attention head, an attention head generating an attention weight matrix having a largest distance between distributions of rows therein.

The detecting may include detecting at least one error attention weight in which differences between attention weights of the target attention head and a guide weight matrix are greater than or equal to a threshold value, among attention weights between the input sequence and the output sequence of the target attention head, and determining an output token corresponding to the at least one error attention weight to be the at least one error output token.

The detecting may include detecting at least one error attention weight in which a similarity to an attention weight of a previous step is greater than or equal to a threshold value, among attention weights between the input sequence and the output sequence of the target attention head, and determining an output token corresponding to the at least one error attention weight to be the at least one error output token.

The correcting may include excluding the at least one error output token from the output sequence.

The correcting may include determining a next input token among other output token candidates other than the at least one error output token.

The determining of the next input token may include determining an input token of a step in which the at least one error output token is output, to be the next input token.

The number of attention heads may correspond to a product of the number of attention layers and the number of decoder layers in the attention-based sequence-to-sequence model.

In another general aspect, an electronic device of an attention-based sequence-to-sequence model includes a processor configured to determine an output sequence corresponding to an input sequence based on an attention-based sequence-to-sequence model, select at least one target attention head from among a plurality of attention heads, detect at least one error output token among output tokens constituting the output sequence based on the target attention head, and correct the output sequence based on the at least one error output token.

The processor may be configured to select, as the target attention head, an attention head generating a predetermined attention weight matrix trained to be a target attention weight matrix corresponding to the target attention head.

The predetermined attention weight matrix may be trained based on a guide weight matrix having a predetermined shape.

The predetermined attention weight matrix may be trained to have a different distribution of attention weights for each step.

The processor may be configured to select, as the target attention head, an attention head generating an attention weight matrix most suitable for a predetermined purpose.

The processor may be configured to select the target attention head based on a guide weight matrix having a predetermined shape according to a predetermined purpose.

The processor may be configured to select the target attention head by performing monotonic regression analysis on attention weight matrices generated by the plurality of attention heads, in response to the attention-based sequence-to-sequence model having monotonic properties.

The processor may be configured to select the target attention head based on entropy of attention weight matrices generated by the plurality of attention heads.

The processor may be configured to select, as the target attention head, an attention head generating an attention weight matrix having the largest entropy from among the attention weight matrices.

The processor may be configured to select, as the target attention head, an attention head generating an attention weight matrix having a largest distance between distributions of rows therein.

The processor may be configured to detect at least one error attention weight in which differences between attention weights of the target attention head and a guide weight matrix are greater than or equal to a threshold value, among attention weights between the input sequence and the output sequence of the target attention head, and determine an output token corresponding to the at least one error attention weight to be the at least one error output token.

The processor may be configured to detect at least one error attention weight in which a similarity to an attention weight of a previous step is greater than or equal to a threshold value, among attention weights between the input sequence and the output sequence of the target attention head, and determine an output token corresponding to the at least one error attention weight to be the at least one error output token.

The processor may be configured to exclude the at least one error output token from the output sequence.

The processor may be configured to determine a next input token among other output token candidates other than the at least one error output token.

The processor may be configured to determine an input token of a step in which the at least one error output token is output, to be the next input token.

In another general aspect, an electronic device includes an encoder and a decoder configured to input an input sequence and to output an output sequence based on the input sequence; and one or more processors configured to select, from a plurality of attention heads included in an attention-based sequence-to-sequence model of the decoder, a target attention head; detect an error output token included in the output sequence based on the target attention head; and correct the output sequence based on the error output token and output a corrected output sequence.

The encoder and the decoder may be included in an artificial neural network.

The one or more processors may be configured to select the target attention head from among a plurality of attention weight matrices stored in the attention-based sequence-to-sequence model.

The attention-based sequence-to-sequence model may store the plurality of attention weight matrices with respect to all of the attention heads by inputting example inputs of correct results into the encoder and the decoder, and the one or more processors may be configured to select, as the target attention head, an attention head that generates an attention weight matrix best suited for an operation of the sequence-to-sequence model.

The one or more processors may be configured to train a specific attention head, from among the plurality of attention heads, to generate an attention weight matrix of a desired shape and to select the specific attention head as the target attention head.

Other features and aspects will be apparent from the following detailed description, the drawings, and the claims.

Figure 1:
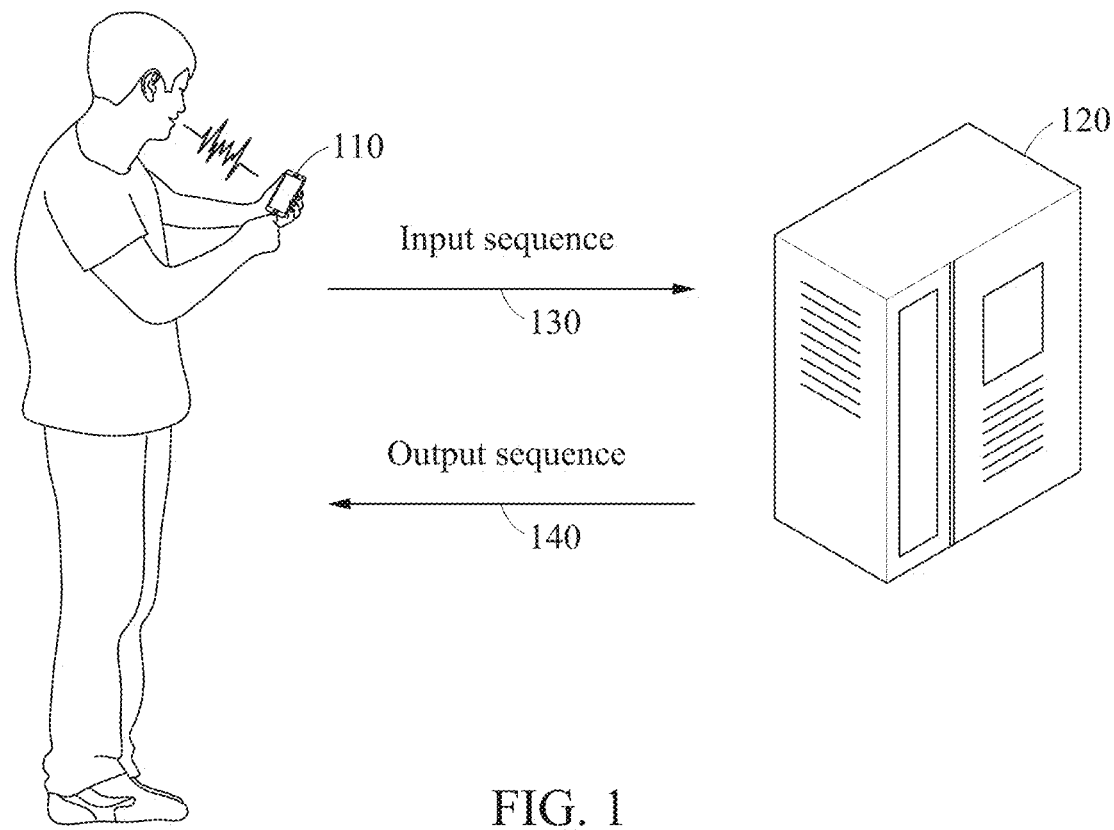
FIG. 1 illustrates an example of a system using a sequence-to-sequence model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Hereinafter, examples will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the examples described above and an element having a common function. Unless otherwise mentioned, the descriptions on the examples may be applicable to the following examples and thus, duplicated descriptions will be omitted for conciseness.

FIG. 1 illustrates an example of a system using a sequence-to-sequence model.

Referring to FIG. 1, a system using a sequence-to-sequence model may include a user terminal 110 and an electronic device 120. The elements in the system shown in FIG. 1 are functionally different each other, and at least one element may be implemented in a form integrated with each other in an actual physical environment. For example, FIG. 1 illustrates the electronic device 120 as a type of server device. However, each function of the electronic device 120 may be implemented in a form embedded in the user terminal 110.

The sequence-to-sequence model may be used in various fields where an output sequence of a different domain is to be output from an input sequence. For example, the sequence-to-sequence model may be used in a speech recognition system, a machine translation system, and a chatbot system. The speech recognition system may receive a speech and output a speech recognition sentence. The machine translation system may receive a first language sentence and output a second language sentence corresponding thereto. The chatbot system may receive a question and output an answer to the question. Hereinafter, for ease of description, a sequence-to-sequence model in a speech recognition system will be described. However, the examples set forth hereinafter may apply to various fields where a sequence-to-sequence model may be used.

In the speech recognition system, the user terminal 110 may receive an input sequence 130 and transmit the input sequence 130 to the electronic device 120, and provide a user with an output sequence 140 received from the electronic device 120. FIG. 1 illustrates the user terminal 110 as a smart phone. However, the user terminal 110 may be one of electronic devices such as a computer, an ultra mobile personal computer (UMPC), a work station, a netbook, a personal digital assistant (PDA), a portable computer, a web tablet, a wireless phone, a mobile phone, an e-book, a portable multimedia player (PMP), a portable game console, a navigation device, a black box, and a digital camera.

The electronic device 120 is a computing device that receives the input sequence 130 of a speaker and provides the output sequence 140 as a recognition result, and may be based on a sequence-to-sequence model. The input sequence 130 may include input data and an input feature vector extracted from the input data. For example, in the speech recognition system, the input sequence 130 may include an input speech and an input speech feature vector extracted from the input speech. Further, the computing device may be a mobile device such as a notebook, a desktop, a laptop, or a smart phone, but is not limited thereto, and may include all kinds of devices equipped with a computing device.

The electronic device 120 may build a sequence-to-sequence model including an artificial neural network, and provide the output sequence 140 being a result of recognizing the input sequence 130 using the built sequence-to-sequence model. The artificial neural network may include, for example, a recurrent neural network (RNN), a convolutional neural network (CNN), a self-attention neural network (SANN), a bi-directional RNN (BRNN), a long short-term memory (LSTM), a bi-directional LSTM (BLSTM), a gated recurrent unit (GRU), and a bi-directional GRU (BGRU), but is not limited thereto.

The electronic device 120 may further include a corrector for improving the accuracy of the output sequence 140. The corrector represents functional elements that are functionally different from the electronic device 120, and at least one element of the corrector may be implemented in a form integrated with the electronic device 120 in an actual physical environment. The electronic device 120 may detect an error in the output sequence 140 using the corrector and output a corrected output sequence.

Hereinafter, an operating method of a multi-head attention-based sequence-to-sequence model will be described with reference to FIGS. 2A to 2C. An attention weight matrix will be described with reference to FIGS. 3A and 3B. A method of improving the quality of an attention-based sequence-to-sequence model will be described with reference to FIGS. 4A to 7.

Figure 2A:
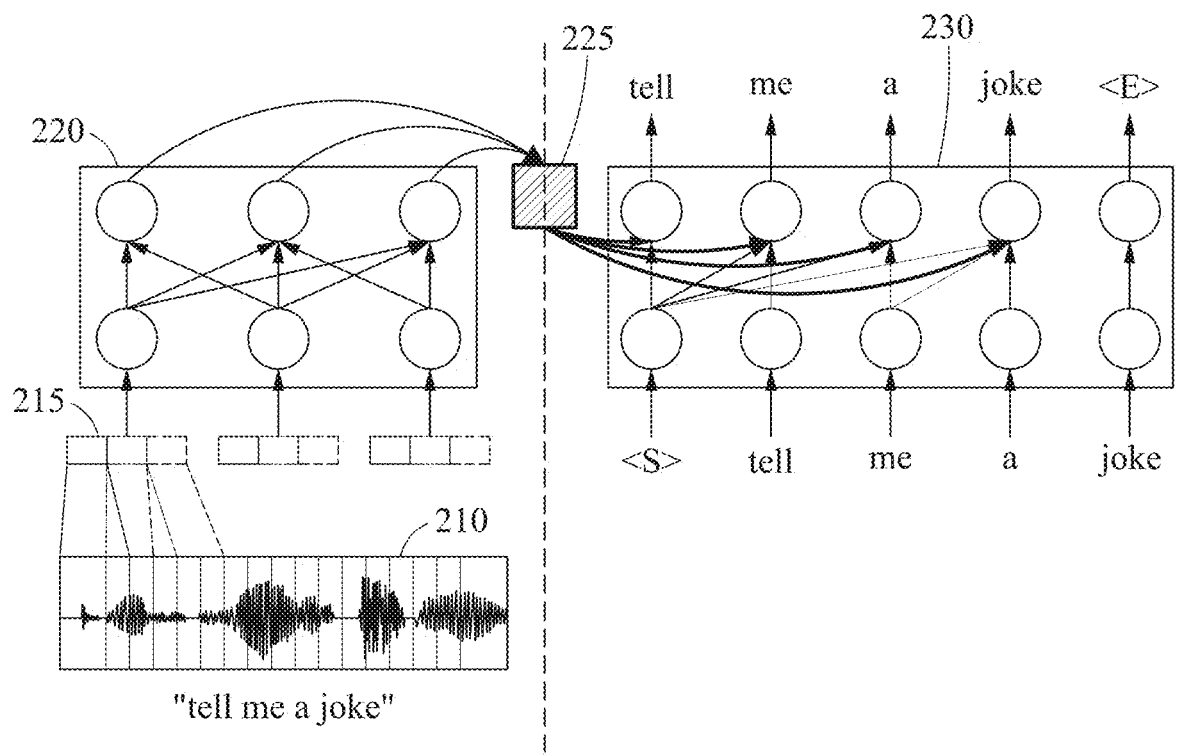
FIG. 2A illustrates an example of an operation of an electronic device having an end-to-end artificial neural network of an encoder-decoder structure.

FIG. 2A illustrates an example of an operation of an electronic device having an end-to-end artificial neural network of an encoder-decoder structure.

Referring to FIG. 2A, an artificial neural network may include an encoder 220 and a decoder 230.

The artificial neural network is an end-to-end artificial neural network of the encoder 220-decoder 230 structure, wherein there is available a path for all parameters of a model to be simultaneously trained with respect to a single loss function, and thus, the encoder 220 and the decoder 230 may be simultaneously trained. The artificial neural network receives an input at one end and generates an output at the other end, and in this case, optimizes network weights considering the input and the output directly. Nodes of layers in the artificial neural network may be in a relationship of non-linearly affecting each other, and parameters of the artificial neural network, such as values output respectively from the nodes and relationships between the nodes, may be optimized by learning.

The end-to-end artificial neural network of the encoder 220-decoder 230 structure has a network structure in which the encoder 220 and the decoder 230 are integrated, and the encoder 220 and the decoder 230 may directly generate the output sequence corresponding to the input sequence from the input sequence.

For example, the electronic device may extract input feature vectors 215 from the input data 210, and the encoder 220 may generate an encoded feature 225 by encoding the input feature vectors 215. The encoder 220 may generate the encoded feature 225 by changing the dimensions of the input feature vectors 215. That is, the encoder 220 may serve to summarize the meaning of the input sequence well.

The encoded feature 225 may be applied to the decoder 230 of the artificial neural network. The decoder 230 may determine an output token based on the encoded feature 225 and a previously determined recognition result, on a token basis.

In detail, the decoder 230 receiving the encoded feature 225 outputs a recognition result on a token basis, wherein a token is a word, a subword, a single character, or a unit forming a single character (for example, an onset, a nucleus, and a coda in Hangul, the alphabet of the Korean language). Hereinafter, the entire recognition result output from the decoder 230 will be referred to as an output sequence. The output sequence may include a plurality of output tokens.

To calculate an output of undetermined length using the artificial neural network, the decoder 230 may continuously predict next tokens one by one by using tokens estimated thus far, until a special token <EOS> which denotes the end appears. The decoder 230 obtains an output token based on information calculated by the encoder 220 for each step. In this example, the output token may be obtained based on output tokens of previous steps. This method is referred to as auto-regressive decoding.

That is, a token selected as an output token by the end-to-end artificial neural network model performing auto-regressive decoding may be determined to be a next input token. For example, in a sentence of "tell me a joke", "me" may be recognized considering "tell" which is an output token of a previous step.

However, the end-to-end neural network of the encoder 220-decoder 230 structure processes the entire input data as a single vector, and thus, if the input data is long, information of the front part of the data is diluted and the quality of the output sequence may be deteriorated. To solve this, for each step in which the decoder 230 estimates an output token, the entire input data of the encoder 220 may be referred to once again. However, rather than referring to the entire input data all at the same rate, the input voice portion related to the output token to be predicted in the step may be considered with more attention.

In detail, attention weights may be set for input frames constituting the input sequence according to the degrees of association with an output token to be predicted in the corresponding step, and the decoder 230 may estimate an output token for each step based on the set attention weights.

The encoder 220 and the decoder 230 may be pre-trained to generate a sequence of recognition results from the received input feature vectors. For example, the model parameters of the encoder 220 and decoder 230 (for example, the weights of synaptic connections and the biases of neurons) may be learned in advance to generate the sequence of recognition results from a sequence of correct answer data pairs corresponding to the input data. Furthermore, the attention weights of the encoder 220 and the decoder 230 may also be learned in advance to generate the sequence of recognition results from the sequence of correct answer text pairs corresponding to the input data.

Figure 2B:
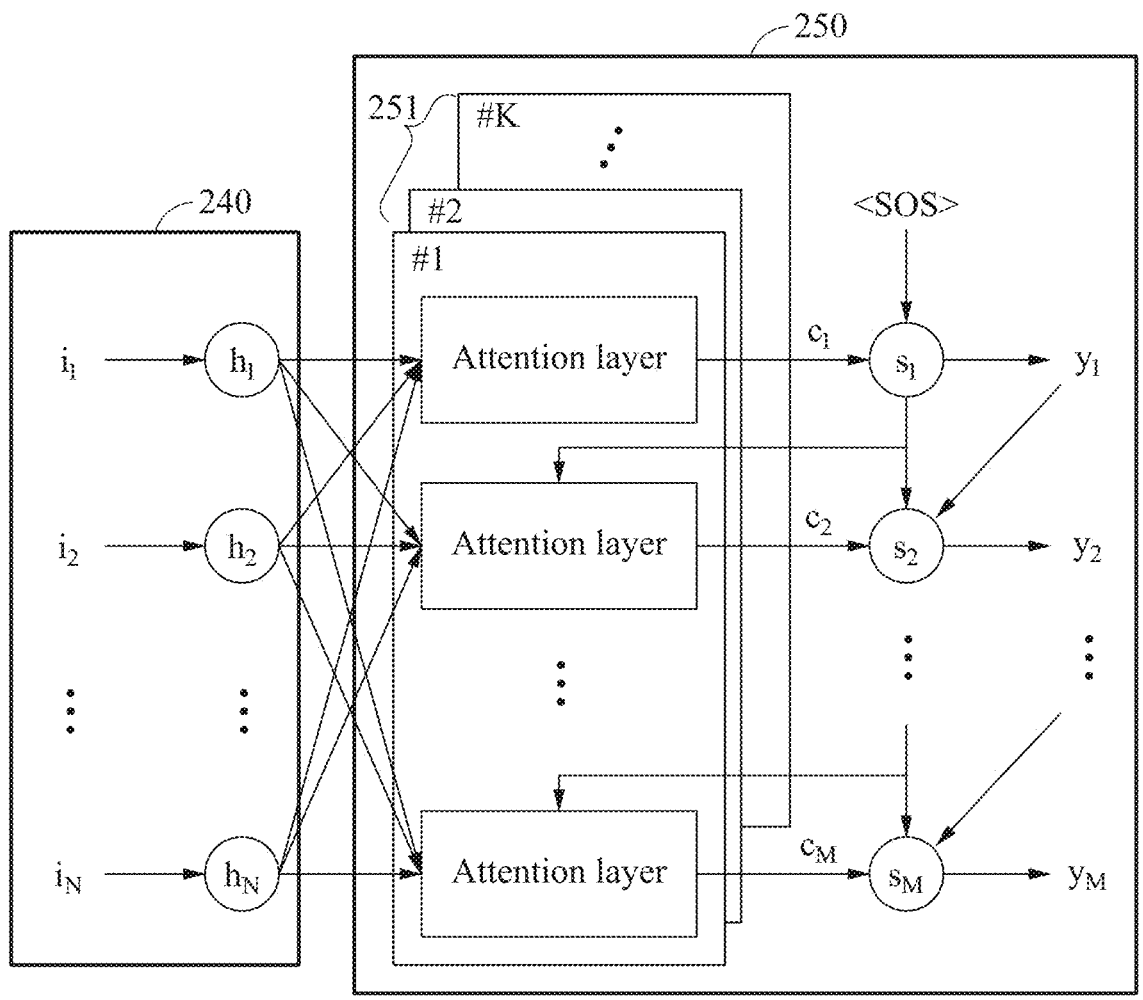
FIGS. 2B and 2C illustrate an example of determining an attention weight.
Figure 2C:
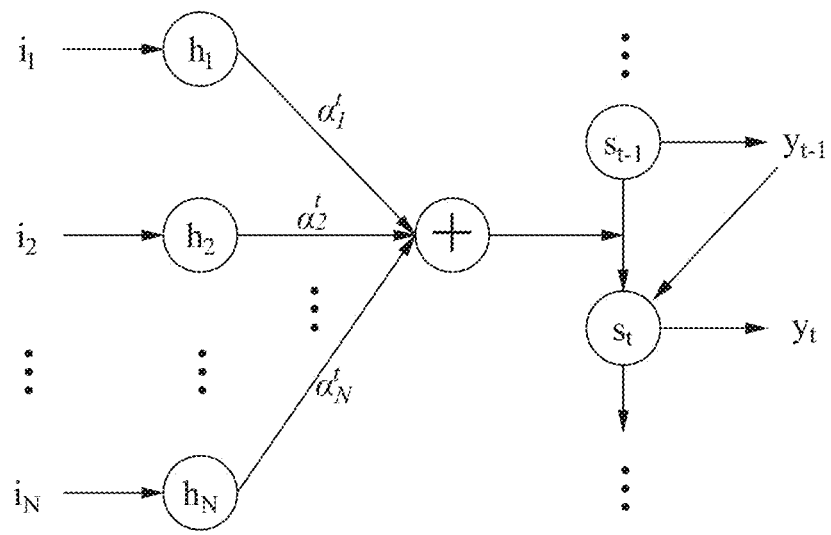

FIGS. 2B and 2C illustrate an example of determining an attention weight.

Referring to FIG. 2B, an encoder 240 may receive an input sequence including input frames (for example, $i_1$ to $i_N$; N denoting the number of input frames) and generate hidden state vectors (for example, $h_1$ to $h_N$) of the encoder.

An attention module 251 may determine attention weights of the respective input frames (for example, $i_1$ to $i_N$) constituting the input sequence in a corresponding step and generate context vectors (for example, $c_1$ to $c_M$, M denoting the number of output tokens) based on the determined attention weights, wherein the determined attention weights may be used when a decoder 250 estimates an output token for each step.

In the case of a multi-head attention-based sequence-to-sequence model, the attention module 251 may be a multi-head attention module, and an attention layer may include a plurality of attention layers (for example, a first attention layer to a k-th attention layer), wherein the respective attention layers may determine the attention weights in parallel and generate the context vectors based on the determined attention weights. The attention module 251 may use the plurality of attention layers trained to play various roles implicitly.

The decoder 250 may receive a hidden state vector $s_{t-1}$ of the decoder of a previous step, an output token $y_{t-1}$ of the previous step, and a context vector $c_t$ of a current step and extract a hidden state vector $s_t$ of the decoder of the current step and an output token $y_t$ of the current step. The context vector $c_t$ of the current step used when the decoder extracts the output token at the current step may be obtained as expressed by Equation 1.

$$C_t = \sum_{i=1}^{N} \alpha_i^t h_i \qquad \text{Equation 1}$$

In Equation 1, $\alpha_i^t$ may denote an attention weight for an i-th input frame in a step t.

Referring to FIG. 2C, $\alpha_i^t$ may be an attention weight for an i-th input frame in a step t, and the sum of the attention weights for all the input frames (for example, the first to N-th input frames) may be "1". If $\alpha_2^t$ is the greatest value between $\alpha_1^t$ and $\alpha_N^t$, the decoder 250 may extract an output token with the most attention to the second input frame in the current step t.

The multi-head attention model has improved performance compared to the existing single attention model, but still has an issue of skipping some outputs (jumping) or continuously repeating the previous output, which is a chronic disadvantage of a sequence-to-sequence model that outputs a variable length.

For example, in response to an input of a speech corresponding to a sentence of "tell me a joke", the multi-head based sequence-to-sequence model may output "tell" and then output "joke" skipping "me a", in some cases.

In addition, in response to an input of an unusual speech or a speech corresponding to words (essendi rerum) never seen before, the multi-head based sequence-to-sequence model may repeat a phrase or a word as shown in Table 1.

TABLE 1

| Correct answer | corollary hence it follows that god is not only the cause of things coming into existence but also of their continuing in existence that is in scholastic phraseology god is cause of the being of things essendi rerum |
|---|---|
| Recognition results | corollary hence it follows that god is not only the cause of things coming into existence but also of their continuing in existence that is in scholastic phraseology god is cause of the being of things as sindi rerum god is cause of the being of things as sindi rerum god is cause of the being of things as sindi rerum god is cause of the being of things acindi rerum god is cause of the being of the being of things as sindi |

Accordingly, the corrector may select target attention heads from among the plurality of attention heads, detect at least one error output token based on the target attention heads, and correct the output sequence based on the error output token, thereby improving the accuracy of the final output sequence of the electronic device.

Figure 3A:
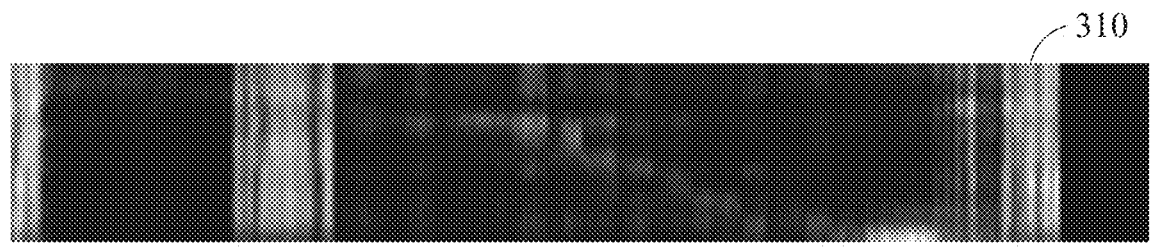
FIGS. 3A and 3B illustrate an example of an attention weight matrix.
Figure 3A:
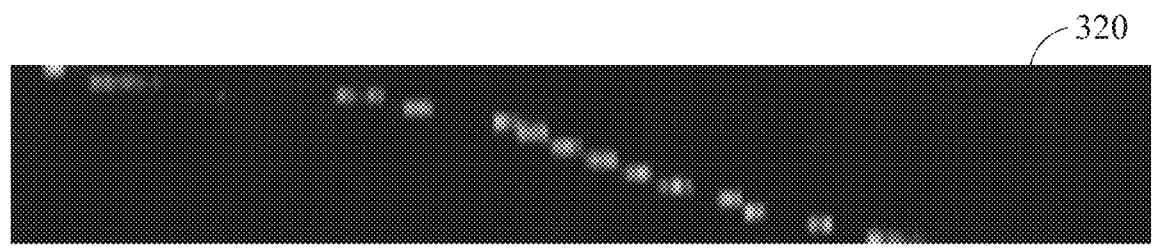
Figure 3B:
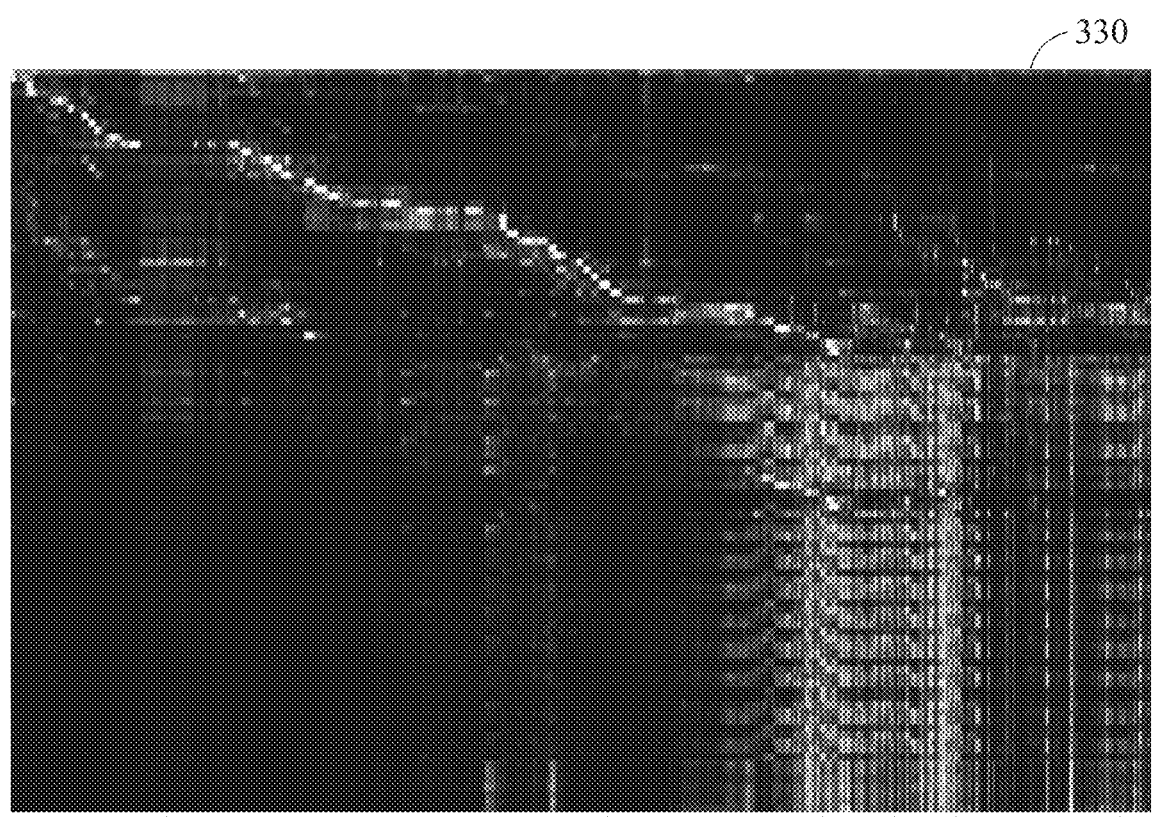

FIGS. 3A and 3B illustrate an example of an attention weight matrix.

An attention weight matrix may have, as elements, attention weights of respective input frames constituting an input sequence, with respect to output tokens constituting an output sequence. For example, in the case where an electronic device outputs an output sequence such as "tell me a joke", the attention weight matrix may be as shown in Table 2 below.

TABLE 2

|  | $i_1$ | $i_2$ | $i_3$ | $i_4$ | $i_5$ | $i_6$ | $i_7$ | $i_8$ | $i_9$ |
|---|---|---|---|---|---|---|---|---|---|
| tell | 0.9 | 0.07 | 0.02 | 0.004 | 0.001 | 0.001 | 0.001 | 0.001 | 0.001 |
| me | 0.004 | 0.02 | 0.9 | 0.07 | 0.001 | 0.001 | 0.001 | 0.001 | 0.001 |
| a | 0.001 | 0.001 | 0.001 | 0.004 | 0.33 | 0.3 | 0.36 | 0.001 | 0.001 |
| joke | 0.001 | 0.001 | 0.001 | 0.001 | 0.001 | 0.62 | 0.37 | 0.004 | 0.001 |

In the example of Table 2, the output tokens may be on a word basis, and each input frame may have a time unit of 10 ms. Referring to Table 2, the output token "tell" has the greatest attention weight, which is 0.9, in an input frame $i_1$, the second greatest attention weight, which is 0.07, in an input frame $i_2$, and the third greatest attention weight, which is 0.02, in an input frame $i_3$. The sum of the attention weights of the input frames $i_1$ to $i_3$ is 0.99, which teaches that the output token "tell" is extracted with attention to the input frames $i_1$ to $i_3$.

In a multi-head based sequence-to-sequence model, one attention weight matrix may be generated per attention head, and each attention weight matrix may be trained to play its role implicitly. For example, a multi-head based sequence-to-sequence model having n attention heads may generate n attention weight matrices.

Referring to FIG. 3A, attention weights of an attention weight matrix may be expressed using colors. For example, in two attention weight matrices 310 and 320, a greater attention weight may be expressed using a color closer to white, and conversely, a smaller attention weight may be expressed using a color closer to black. In the two attention weight matrices 310 and 320, the horizontal axis denotes input frames in temporal order from left to right, and the vertical axis denotes output tokens (for example, words) in temporal order from top to bottom.

In the case of estimating an output sequence using a plurality of attention weight matrices, the respective attention weight matrices may play different roles. It may be interpreted that the two attention weight matrices 310 and 320 play different roles although trained implicitly. For example, the attention weight matrix 310 has a relatively great attention weight in a silent period where there is no actual utterance in the speech, which helps to well ignore background noise when constructing an output. The attention weight matrix 320 has a relatively great attention weight at the position of each word that is actually uttered in the speech, which helps to pay attention to the speech portion of the word to be actually recognized.

As described above, the multi-head attention model has improved performance compared to the existing single attention model, but has an issue of skipping some outputs (jumping) or continuously repeating the previous output, which is a chronic disadvantage of a sequence-to-sequence model that outputs a variable length.

For example, an attention weight matrix 330 of FIG. 3B shows an example of failing normal recognition and providing repeated error outputs. The attention weight matrix 330 and the attention weight matrix 320 may be generated by the same attention head. However, the attention weight matrix 320 is an example of normally generating output tokens, and the attention weight matrix 330 is an example of providing error outputs that continuously repeat a previous output. Referring to the attention weight matrix 330, a normal result is output up to about one-third point based on the x-axis denoting the output tokens, but thereafter, several output tokens (for example, words) are continuously repeated and output.

A corrector may select a predetermined attention head to correct such errors, and suppress error outputs by analyzing an attention weight of the attention head (hereinafter, the target attention head), thereby increasing the quality of the multi-head based sequence-to-sequence model. An example of improving the quality of the attention-based sequence-to-sequence model will be described in detail below with reference to FIGS. 4A to 7.

Figure 4A:
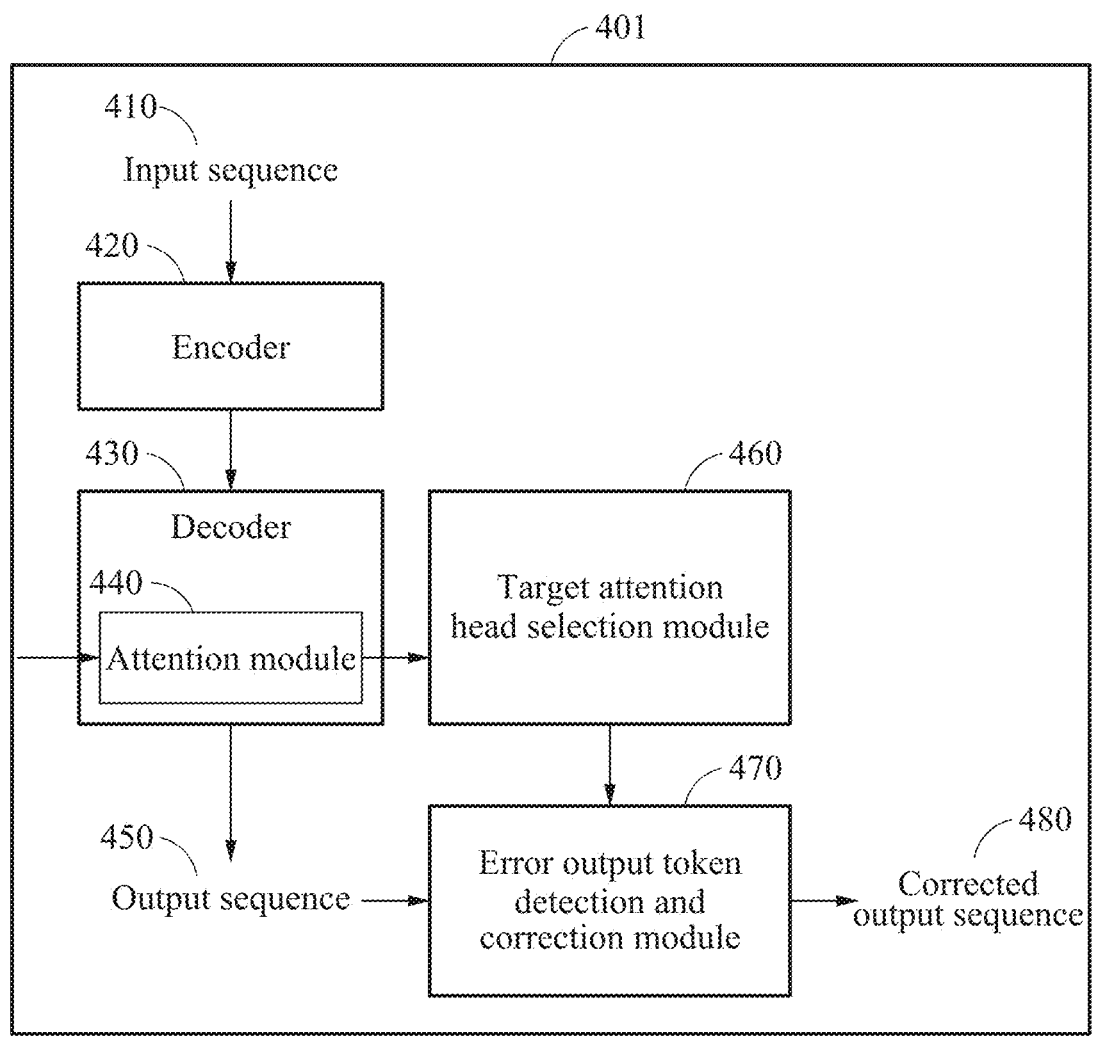
FIG. 4A illustrates an example of an electronic device.

FIG. 4A illustrates an example of an electronic device.

Referring to FIG. 4A, an electronic device 401 may include an encoder 420, a decoder 430, a target attention head selection module 460, and an error output token detection and correction module 470. Although FIG. 4A shows only the elements associated with the example, the electronic device 401 may further include other general-purpose elements. In addition, the elements of the electronic device 401 shown in FIG. 4A are separately illustrated to indicate that the elements may be separated functionally and logically, which, however, does not indicate that the elements are necessarily physically separated elements or are implemented by separate codes. The elements may be implemented in the form of being integrated with each other in an actual physical environment. Hereinafter, the respective elements of the electronic device 401 will be described.

The electronic device 401 may further include a feature vector extraction module (not shown). The feature vector extraction module may extract feature vectors from an input signal (for example, a speech signal). The input signal is a signal including information for a plurality of frames, and the feature vectors may be a sequence of information extracted on a frame basis and expressed as a multidimensional vector. Hereinafter, an input sequence may include the input signal and the feature vectors extracted from the input signal, and may include information on each input frame.

The encoder 420 and the decoder 430 of FIG. 4A may correspond to the encoder 220 and decoder 230 described with reference to FIG. 2A. Therefore, descriptions overlapping with those in FIG. 2A will be omitted. The decoder 430 may include an attention module 440 that determines an input frame requiring more attention each time an output token for each step is to be estimated. In detail, the attention module 440 may determine attention weights of input frames constituting the input sequence in each step, the attention weights to be used when the decoder 430 estimates an output token for each step. The decoder 430 may estimate the output token for each step based on the set attention weights. The attention module 440 may be a multi-head attention module. The multi-head attention module may divide all the dimensions into a plurality of units and apply attention multiple times, rather than applying attention only once to all the dimensions using a plurality of attention layers trained to play various roles. Further, the attention module 440 may store attention weight matrices of all attention heads.

The electronic device 401 may output an output sequence 450 corresponding to an input sequence 410 using the encoder 420 and the decoder 430. However, as described above, the output sequence 450 may be different from expected.

The electronic device 401 may select a target attention head from among a plurality of attention heads using the target attention head selection module 460 and output, as a final result, an output sequence 480 corrected by detecting an error output token among output tokens included in an output sequence based on the selected target attention head using the error output token detection and correction module 470.

In detail, the target attention head selection module 460 may select the target attention head from among a plurality of attention weight matrices stored in the attention module 440. The attention module 440 may store the attention weight matrices with respect to all attention heads by inputting example inputs of correct results into the encoder 420 and decoder 430, and the target attention head selection module 460 may select, as the target attention head, an attention head generating an attention weight matrix most appropriate for the purpose of the sequence-to-sequence model from among all the stored attention heads. Here, the operation of storing the attention weight matrices and selecting the target attention head may be performed in advance before receiving the input sequence 410 for which whether there is an error is to be determined.

As described above, the electronic device 401 may include a corrector, and the corrector may include the target attention head selection module 460 and the error output token detection and correction module 470.

Figure 4B:
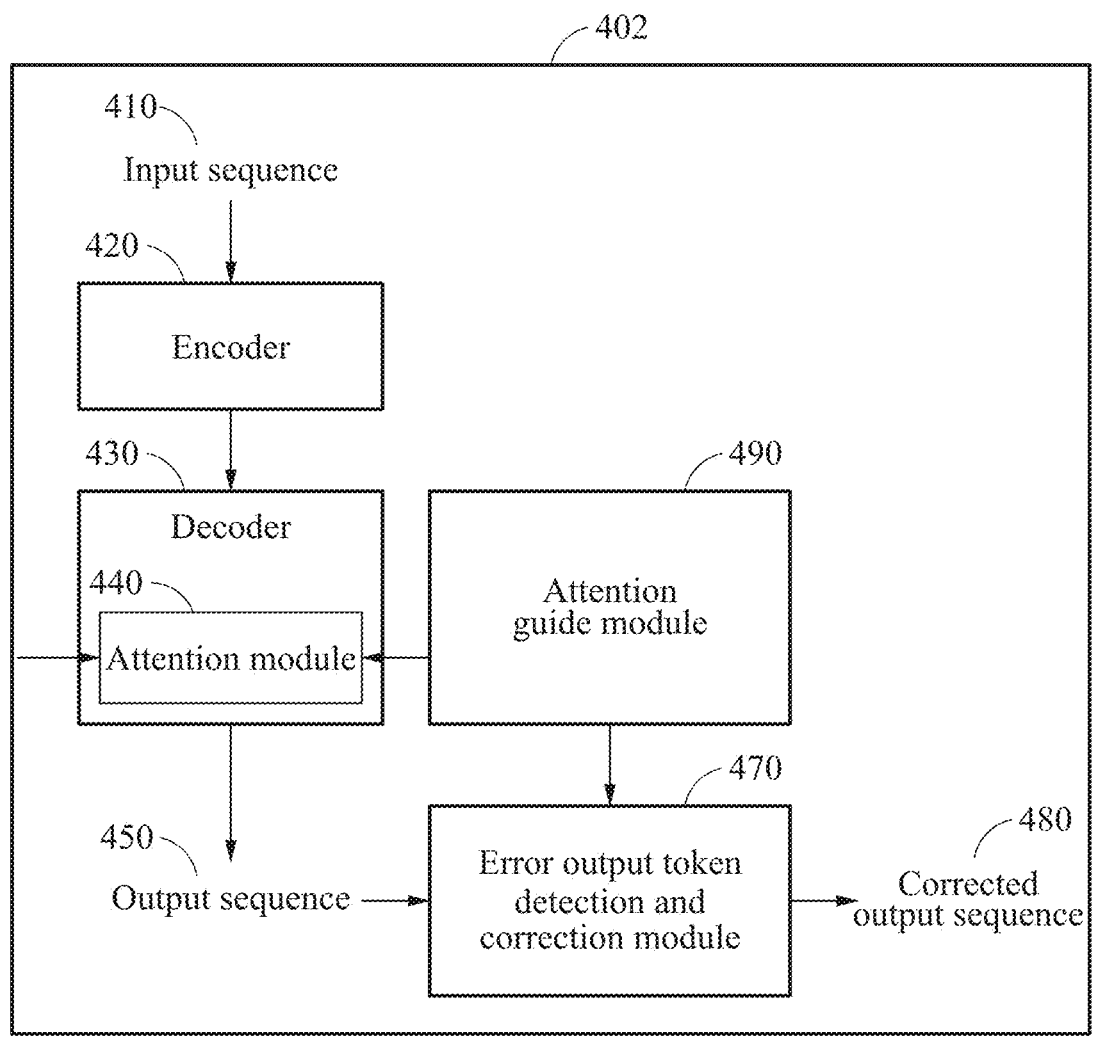
FIG. 4B illustrates an example of an electronic device.

FIG. 4B illustrates an example of an electronic device.

Referring to FIG. 4B, an electronic device 402 may include an attention guide module 490 instead of the target attention head selection module 460 of the electronic device 401 of FIG. 4A. The description of FIGS. 1 to 4A is also applicable to the example of FIG. 4B, and thus a duplicated description will be omitted.

Unlike the electronic device 401 of FIG. 4A selecting a target attention head from among the attention weight matrices stored in the attention module 440, the electronic device 402 of FIG. 4B may train a predetermined attention head to be explicitly utilized as a target attention head.

In detail, the attention guide module 490 may train a predetermined attention head to generate an attention weight matrix of a desired shape, and inform the error output token detection and correction module 470 of the trained attention head as a target attention layer when determining in the future whether an output sequence includes an error.

As described above, the electronic device 402 may include a corrector, and the corrector may include the attention guide module 490 and the error output token detection and correction module 470.

Figure 5:
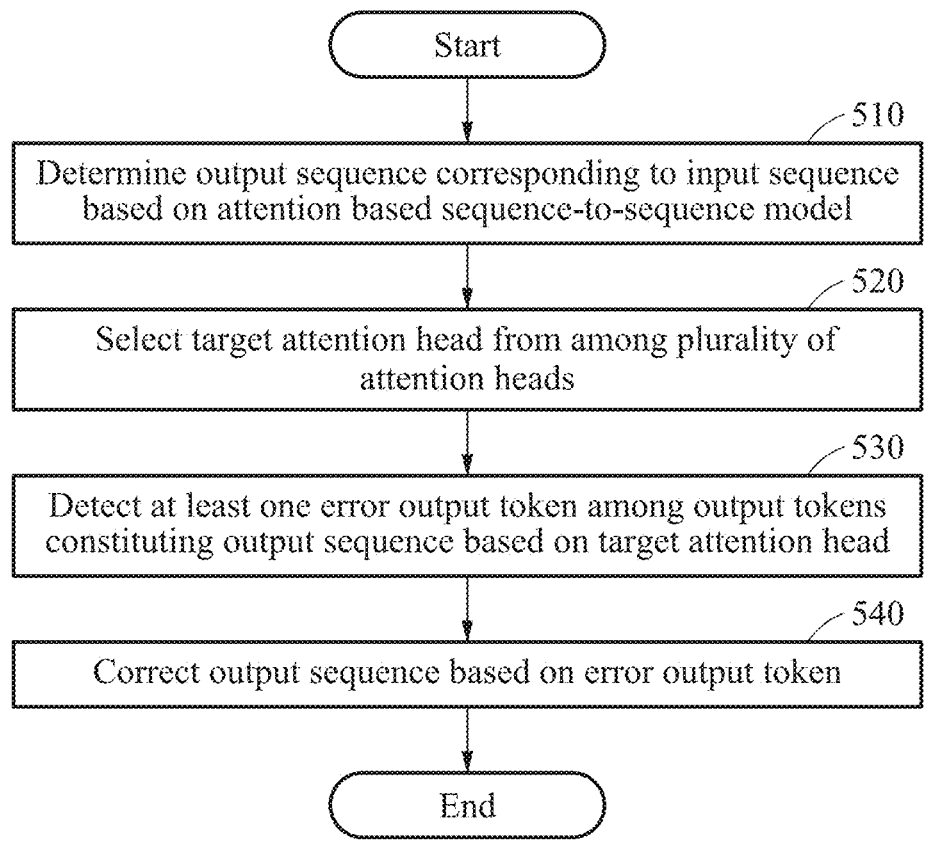
FIG. 5 illustrates an example of a method of improving the quality of an attention-based sequence-to-sequence model.

FIG. 5 illustrates an example of a method of improving the quality of an attention-based sequence-to-sequence model.

Referring to FIG. 5, operations 510 to 540 may be performed by one of the electronic devices described above with reference to FIGS. 1 to 4B. The electronic device may be implemented by one or more hardware modules, one or more software modules, or various combinations thereof, and as described above, the electronic device may include a corrector. The description of FIGS. 1 to 4A is also applicable to the example of FIG. 5, and thus a duplicated description will be omitted.

In operation 510, the electronic device determines an output sequence corresponding to an input sequence based on an attention-based sequence-to-sequence model. For example, the electronic device may receive an input speech or input speech feature vectors corresponding to the input speech.

In operation 520, the electronic device selects at least one target attention head from among the plurality of attention heads. An electronic device based on a multi-head attention-based sequence-to-sequence model may have as many attention heads as the product of the number of attention layers and the number of decoder layers. The attention weight matrices generated by the respective attention heads may play different roles. The electronic device may select, as a target attention head, at least one attention head generating an attention weight matrix most appropriate for the purpose of the multi-head based sequence-to-sequence model, from among the attention heads generating attention weight matrices that play different roles.

There are two methods of selecting a target attention head. The first method may store in advance attention weight matrices for all attention heads by inputting example inputs of correct results into the electronic device and find an attention head generating an attention weight matrix most appropriate for the purpose of the sequence-to-sequence model among all the stored attention heads. The second method may train a predetermined attention head to generate an attention weight matrix of a desired shape and select the generated attention weight matrix as a target attention layer.

According to the first method, the electronic device may select, as the target attention head, an attention head generating an attention weight matrix most suitable for a predetermined purpose from among the plurality of attention heads.

The electronic device may select the target attention head based on a guide weight matrix having a predetermined shape according to a predetermined purpose. For example, speech recognition has monotonic properties if an input sequence (for example, an input speech) is mapped to an output sequence (for example, recognized words) based on time. In this example, the electronic device may perform a monotonic regression analysis on the attention weight matrices generated by the plurality of attention heads, thereby selecting an attention head best satisfying the monotonic properties as the target attention head. The guide weight matrix may be a monotonic matrix.

Figure 6:
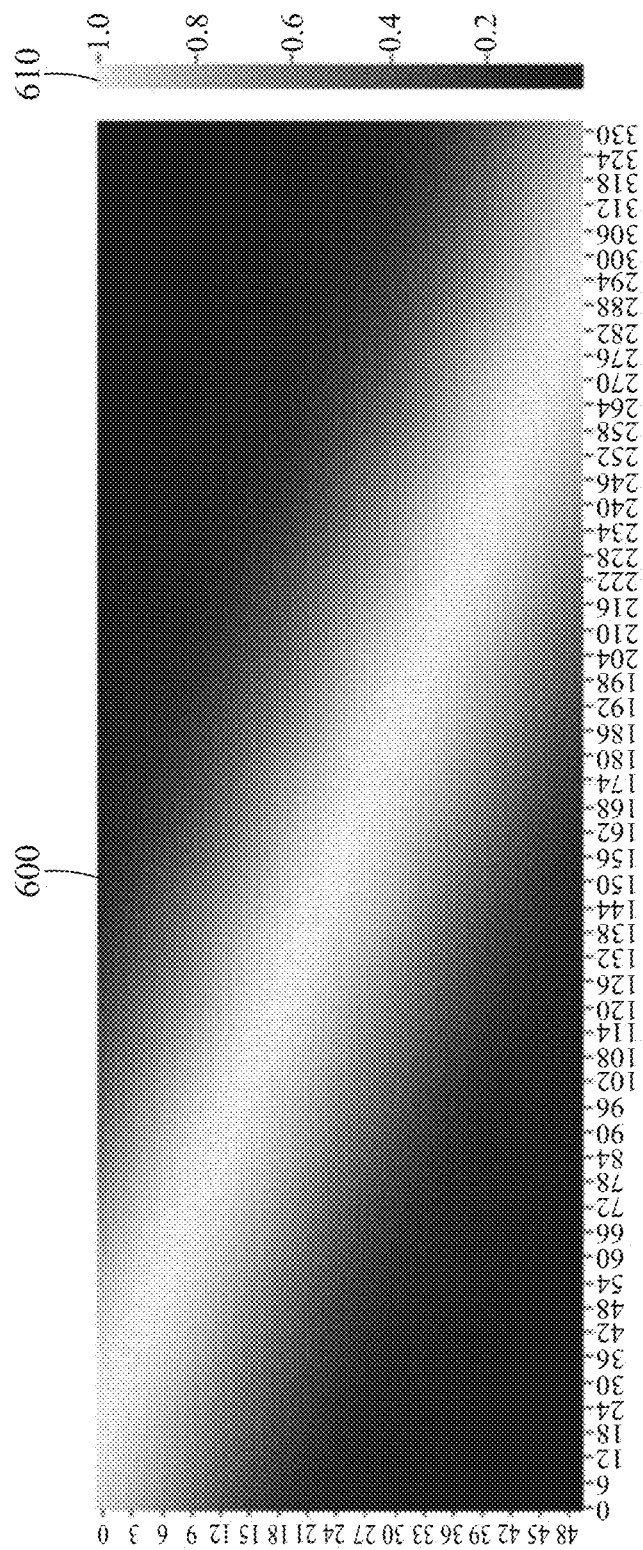
FIG. 6 illustrates an example of a guide weight matrix having a predetermined form.

FIG. 6 illustrates an example of a guide weight matrix having a predetermined form.

Referring to FIG. 6, a guide weight matrix 600 may have attention weights inducing an attention-based sequence-to-sequence model to have monotonic properties. The attention weights of the guide weight matrix 600 may be determined as expressed by Equation 2 below.

$$W[i, j] = \exp\left(-\frac{\left(\frac{j}{J} - \frac{(i+s_b)}{I+s_b+s_e} 2\right)}{2g^2}\right)$$

Equation 2

In Equation 2, i denotes the length of an output sequence, j denotes the length of an input sequence, $s_b$ denotes a start shift, $s_e$ denotes an end shift, and g denotes a diffusion ratio. Referring to a bar 610, the colors in the guide weight matrix 600 may indicate the attention weights.

Referring to FIG. 5 again, in the case of a task of viewing an input in various manners, for example, translation and summary, another example of the first method may configure a guide weight matrix having a guide attention weight different from a previous attention weight, rather than having an attention weight of a predetermined shape, when generating each output token. In this example, the electronic device may select the target attention head based on entropy of the attention weight matrices generated by the plurality of attention heads. The electronic device may select, as the target attention head, an attention head generating an attention weight matrix having the largest entropy from among the attention weight matrices. For example, the electronic device may select, as the target attention head, an attention head generating an attention weight matrix having a largest distance between distributions of rows therein from among the attention weight matrices. In detail, the electronic device may select, as the target attention head, an attention head generating an attention weight having the greatest Kullback-Leibler divergence by calculating Kullback-Leibler divergences. The Kullback-Leibler divergence may be clearly understood by one having ordinary knowledge in the technical field, and thus a detailed description will be omitted.

Figure 7:
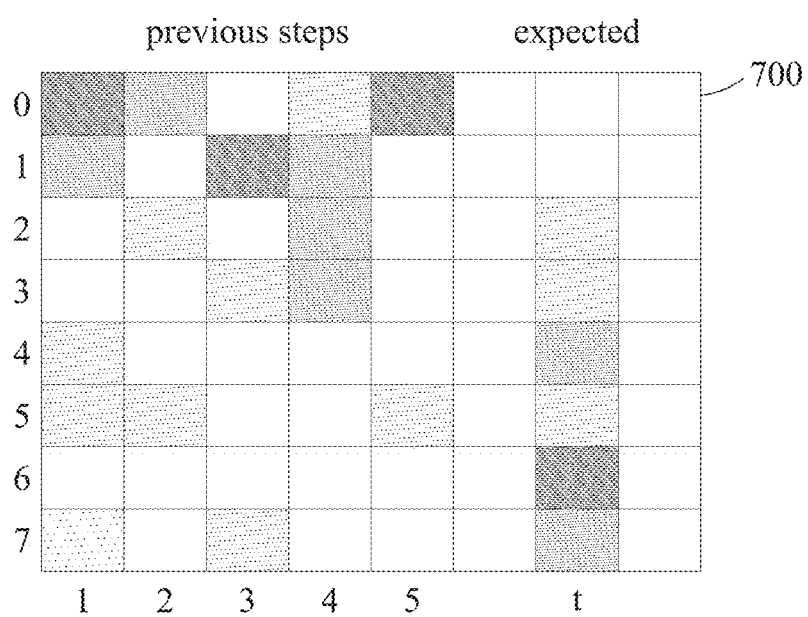
FIG. 7 illustrates an example of a guide weight matrix configured to have an attention weight different from a previous attention weight when generating each output token.

FIG. 7 illustrates an example of a guide weight matrix configured to have an attention weight different from a previous attention weight when generating each output token.

Referring to FIG. 7, a guide weight matrix 700 may be configured to have an attention weight different from a previous attention weight when generating each output token. In FIG. 7, the x-axis may correspond to an output sequence, and the y-axis may correspond to an input sequence. When predicting an output token t, the guide weight matrix 700 may have a greater attention weight in a 6-th input frame which was less significant when predicting the previous output tokens.

Referring to FIG. 5 again, according to the second method, the electronic device may train a predetermined attention head to generate an attention weight matrix of a desired shape and select the generated attention weight matrix as the target attention layer. The electronic device may select, as the target attention head, an attention head generating a predetermined attention weight matrix trained to be a target attention weight matrix corresponding to the target attention head.

For example, the predetermined attention weight matrix may be trained based on a guide weight matrix having a predetermined shape according to a predetermined purpose. The guide weight matrix having a predetermined shape according to a predetermined purpose may be the guide matrix described in the first method. For example, the electronic device may train the predetermined attention weight matrix to have monotonic properties based on the guide matrix 600 of FIG. 6.

As another example, in the case of a task of viewing an input in various manners, for example, translation and summary, the predetermined attention weight matrix may be trained to have a different distribution of attention weights for each step. The predetermined attention weight matrix may be trained to determine an attention weight of a current step based on a cumulative sum of attention weights of previous steps. For example, referring to FIG. 7, for each step of predicting an output token, a cumulative sum of attention weights of previous steps may be calculated, and the predetermined attention weight matrix may be trained to have a relatively great attention weight for a relatively small cumulative sum of the attention weights of the previous steps.

The second method may train the predetermined attention weight matrix to naturally generate an attention weight of a shape similar to that of a guide weight matrix in an artificial neural network training process by utilizing the guide weight matrix as a bias, or may explicitly add a loss function such as a Kullback-Leibler divergence, as an artificial neural network training loss.

In operation 530, the electronic device detects at least one error output token among output tokens constituting the output sequence based on the target attention head. The electronic device may determine the target attention head in advance before determining whether the output sequence includes an error. The electronic device may detect the at least one error output token based on the determined target attention head.

For example, the electronic device may obtain an attention weight matrix (hereinafter, referred to as a target attention weight matrix) between the input sequence, for which whether a target attention head includes an error is to be determined, and the output sequence. The electronic device may detect at least one error attention weight in which differences between attention weights of the target attention head and attention weights of a guide weight matrix are greater than or equal to a first threshold value. For example, the electronic device may detect at least one error attention weight in which differences in Kullback-Leibler divergence between the attention weights of the target attention head and the attention weights of the guide weight matrix are greater than or equal to the first threshold value. The electronic device may determine an output token corresponding to the error attention weight to be the error output token.

As another example, in the case of a task of viewing an input in various manners, for example, translation and summary, the electronic device may detect at least one error attention weight in which a similarity to an attention weight of a previous step is greater than or equal to a second threshold value, among the attention weights of the target attention weight matrix.

In operation 540, the electronic device may correct the output sequence based on the error output token. The electronic device may detect the error output token once the entire output sequence is determined, and correct the output sequence based on the error output token. In this example, the electronic device may correct the error in the output sequence by excluding the error output token from the output sequence.

Alternatively, the electronic device may detect an error output token for each step of predicting an output token in real time, and correct the output sequence based on the error output token. If the error output token is not corrected, the electronic device should determine a next output token based on the error output token. However, the electronic device may not only exclude the error output token from the output sequence but also determine a next input token among other output token candidates except for the error output token. For example, the electronic device may determine an input token of a step in which the error output token is output, to be the next input token. When "tell" and then "joke" are output skipping "me a" in response to an input of a speech corresponding to a sentence of "tell me a joke", "joke" may not be input as the next input token, and "tell" may be input as the next input token one more time. Alternatively, the error output token may be excluded, and an output token candidate having the highest probability may be determined to be the next input token.

Table 3 below shows that the electronic device corrects the error of repeating one word.

TABLE 3

| | |
|---|---|
| Correct answer | corollary hence it follows that god is not only the cause of things coming into existence but also of their continuing in existence that is in scholastic phraseology god is cause of the being of things essendi rerum |
| Existing recognition results | corollary hence it follows that god is not only the cause of things coming into existence but also of their continuing in existence that is in scholastic phraseology god is cause of the being of things as sindi rerum god is cause of the being of things as sindi rerum god is cause of the being of things as sindi rerum god is cause of the being of things acindi rerum god is cause of the being of the being of things as sindi |
| Recognition result of electronic device | corollary hence it follows that god is not only the cause of things coming into existence but also of their continuing in existence that is in scholastic phraseology god is cause of the being of things as sindi re |

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described examples, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of improving the quality of an attention-based sequence-to-sequence model, the method comprising:
   determining an output sequence corresponding to an input sequence based on an attention-based sequence-to-sequence model;
   selecting at least one target attention head from among a plurality of attention heads each configured to generate a respective attention weight matrix;
   detecting at least one error output token among output tokens constituting the output sequence based on the target attention head; and
   correcting the output sequence based on the at least one error output token.

2. The method of claim 1, wherein the selecting comprises selecting, as the target attention head, an attention head generating a predetermined attention weight matrix trained to be a target attention weight matrix corresponding to the target attention head.

3. The method of claim 2, wherein the predetermined attention weight matrix is trained based on a guide weight matrix having a predetermined shape.

4. The method of claim 3, wherein the guide weight matrix is determined based on any one or any combination of an output sequence length, an input frame length, a start shift, an end shift, and a diffusion ratio.

5. The method of claim 2, wherein the predetermined attention weight matrix is trained to have a different distribution of attention weights for each step.

6. The method of claim 2, wherein the predetermined attention weight matrix is trained to determine an attention weight of a current step based on a cumulative sum of attention weights of previous steps.

7. The method of claim 1, wherein the selecting comprises selecting, as the target attention head, an attention head generating an attention weight matrix most suitable for a predetermined purpose.

8. The method of claim 1, wherein the selecting comprises selecting the target attention head based on a guide weight matrix having a predetermined shape according to a predetermined purpose.

9. The method of claim 1, wherein the selecting comprises selecting the target attention head by performing monotonic regression analysis on attention weight matrices generated by the plurality of attention heads, in response to the attention-based sequence-to-sequence model having monotonic properties.

10. The method of claim 1, wherein the selecting comprises selecting the target attention head based on entropy of attention weight matrices generated by the plurality of attention heads.

11. The method of claim 10, wherein the selecting of the target attention head based on the entropy comprises selecting, as the target attention head, an attention head generating an attention weight matrix having the largest entropy from among the attention weight matrices.

12. The method of claim 10, wherein the selecting of the target attention head based on the entropy comprises selecting the target attention head based on a Kullback-Leibler divergence.

13. The method of claim 1, wherein the selecting comprises selecting, as the target attention head, an attention head generating an attention weight matrix having a largest distance between distributions of rows therein.

14. The method of claim 1, wherein the detecting comprises:
detecting at least one error attention weight in which differences between attention weights of the target attention head and a guide weight matrix are greater than or equal to a threshold value, among attention weights between the input sequence and the output sequence of the target attention head; and
determining an output token corresponding to the at least one error attention weight to be the at least one error output token.

15. The method of claim 1, wherein the detecting comprises:
detecting at least one error attention weight in which a similarity to an attention weight of a previous step is greater than or equal to a threshold value, among attention weights between the input sequence and the output sequence of the target attention head; and
determining an output token corresponding to the at least one error attention weight to be the at least one error output token.

16. The method of claim 1, wherein the correcting comprises excluding the at least one error output token from the output sequence.

17. The method of claim 1, wherein the correcting comprises determining a next input token among other output token candidates other than the at least one error output token.

18. The method of claim 17, further comprising determining an input token of a step in which the at least one error output token is output, to be the next input token.

19. The method of claim 1, wherein the number of attention heads corresponds to a product of the number of attention layers and the number of decoder layers in the attention-based sequence-to-sequence model.

20. A non-transitory computer-readable storage medium storing instructions that, when executed by a processor, cause the processor to perform the method of claim 1.

21. An electronic device of an attention-based sequence-to-sequence model, the electronic device comprising:
a processor configured to determine an output sequence corresponding to an input sequence based on an attention-based sequence-to-sequence model, select at least one target attention head from among a plurality of attention heads each configured to generate a respective attention weight matrix, detect at least one error output token among output tokens constituting the output sequence based on the target attention head, and correct the output sequence based on the at least one error output token.

22. The electronic device of claim 21, wherein the processor is configured to select, as the target attention head, an attention head generating a predetermined attention weight matrix trained to be a target attention weight matrix corresponding to the target attention head.

23. The electronic device of claim 22, wherein the predetermined attention weight matrix is trained based on a guide weight matrix having a predetermined shape.

24. The electronic device of claim 22, wherein the predetermined attention weight matrix is trained to have a different distribution of attention weights for each step.

25. The electronic device of claim 21, wherein the processor is configured to select, as the target attention head, an attention head generating an attention weight matrix most suitable for a predetermined purpose.

26. The electronic device of claim 21, wherein the processor is configured to select the target attention head based on a guide weight matrix having a predetermined shape according to a predetermined purpose.

27. The electronic device of claim 21, wherein the processor is configured to select the target attention head by performing monotonic regression analysis on attention weight matrices generated by the plurality of attention heads, in response to the attention-based sequence-to-sequence model having monotonic properties.

28. The electronic device of claim 21, wherein the processor is configured to select the target attention head based on entropy of attention weight matrices generated by the plurality of attention heads.

29. The electronic device of claim 28, wherein the processor is configured to select, as the target attention head, an attention head generating an attention weight matrix having the largest entropy from among the attention weight matrices.

30. The electronic device of claim 21, wherein the processor is configured to select, as the target attention head, an attention head generating an attention weight matrix having a largest distance between distributions of rows therein.

31. The electronic device of claim 21, wherein the processor is configured to detect at least one error attention weight in which differences between attention weights of the target attention head and a guide weight matrix are greater than or equal to a threshold value, among attention weights between the input sequence and the output sequence of the target attention head, and determine an output token corresponding to the at least one error attention weight to be the at least one error output token.

32. The electronic device of claim 21, wherein the processor is configured to detect at least one error attention weight in which a similarity to an attention weight of a previous step is greater than or equal to a threshold value, among attention weights between the input sequence and the output sequence of the target attention head, and determine an output token corresponding to the at least one error attention weight to be the at least one error output token.

33. The electronic device of claim 21, wherein the processor is configured to exclude the at least one error output token from the output sequence.

34. The electronic device of claim 21, wherein the processor is configured to determine a next input token among other output token candidates other than the at least one error output token.

35. The electronic device of claim 34, wherein the processor is configured to determine an input token of a step in which the at least one error output token is output, to be the next input token.

36. An electronic device comprising:
an encoder and a decoder configured to input an input sequence and to output an output sequence based on the input sequence; and
one or more processors configured to:
select, from a plurality of attention heads each configured to generate a respective attention weight matrix and included in an attention-based sequence-to-sequence model of the decoder, a target attention head;
detect an error output token included in the output sequence based on the target attention head; and
correct the output sequence based on the error output token and output a corrected output sequence.

37. The electronic device of claim 36, wherein the encoder and the decoder are included in an artificial neural network.

38. The electronic device of claim 36, wherein the one or more processors are configured to select the target attention head from among a plurality of attention weight matrices stored in the attention-based sequence-to-sequence model.

39. The electronic device of claim 38, wherein the attention-based sequence-to-sequence model stores the plurality of attention weight matrices with respect to all of the attention heads by inputting example inputs of correct results into the encoder and the decoder, and
the one or more processors are configured to select, as the target attention head, an attention head that generates an attention weight matrix best suited for an operation of the sequence-to-sequence model.

40. The electronic device of claim 36, wherein the one or more processors are configured to train a specific attention head, from among the plurality of attention heads, to generate an attention weight matrix of a desired shape and to select the specific attention head as the target attention head.

* * * * *